(12) United States Patent
Huot-Marchand

(10) Patent No.: US 11,649,412 B2
(45) Date of Patent: May 16, 2023

(54) METHOD FOR MANUFACTURING A MECHANICAL TIMEPIECE PART PROVIDED WITH A MAGNETIC FUNCTIONAL AREA

(71) Applicant: ETA SA Manufacture Horlogère Suisse, Grenchen (CH)

(72) Inventor: Sylvain Huot-Marchand, Le Locle (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 355 days.

(21) Appl. No.: 16/951,340

(22) Filed: Nov. 18, 2020

(65) Prior Publication Data

US 2021/0189278 A1 Jun. 24, 2021

(30) Foreign Application Priority Data

Dec. 18, 2019 (EP) .................................. 19217582

(51) Int. Cl.

| | |
|---|---|
| *C10M 109/02* | (2006.01) |
| *C10M 177/00* | (2006.01) |
| *G04B 13/02* | (2006.01) |
| *G04B 15/14* | (2006.01) |
| *H01F 1/44* | (2006.01) |
| *C10N 40/06* | (2006.01) |

(Continued)

(52) U.S. Cl.
CPC ........ *C10M 109/02* (2013.01); *C10M 177/00* (2013.01); *G04B 13/02* (2013.01); *G04B 15/14* (2013.01); *H01F 1/44* (2013.01); *C10M 2290/00* (2013.01); *C10N 2040/06* (2013.01); *C10N 2050/08* (2013.01); *C10N 2070/00* (2013.01)

(58) Field of Classification Search
CPC ........... G04B 13/02; G04B 15/14; H01F 1/44; C10M 109/02; C10N 2040/06
See application file for complete search history.

(56) References Cited

U.S. PATENT DOCUMENTS

2014/0319741 A1* 10/2014 Poffet ..................... B29C 33/50
264/219
2017/0242403 A1 8/2017 Di Domenico et al.
(Continued)

FOREIGN PATENT DOCUMENTS

| CH | 710846 A2 | 9/2016 | |
|---|---|---|---|
| CH | 710846 A2 * | 9/2016 | ............. G04B 15/14 |

(Continued)

OTHER PUBLICATIONS

European Search Report of EP19217582.6 dated Jun. 24, 2020.
(Continued)

*Primary Examiner* — Edwin A. Leon
*Assistant Examiner* — Kevin Andrew Johnston
(74) *Attorney, Agent, or Firm* — Sughrue Mion, PLLC

(57) ABSTRACT

A method for manufacturing a mechanical timepiece part (1) including at least one functional area (2) wherein a lubricant (9) is able to be confined, the method including a step (10) of constructing a blank of the part (1) including the at least one functional area (2) and a step of transforming (12) the at least one functional area (2) into a magnetised functional area (2) capable of cooperating with the lubricant (9) when it has magnetic properties.

5 Claims, 1 Drawing Sheet

(51) Int. Cl.
  *C10N 50/08* (2006.01)
  *C10N 70/00* (2006.01)

(56) References Cited

U.S. PATENT DOCUMENTS

2017/0329282 A1* 11/2017 Theurillat-Bonjour ..................... G04B 13/027
2021/0191326 A1   6/2021 Huot-Marchand

FOREIGN PATENT DOCUMENTS

| CN | 101280803 | B | 6/2010 | | |
|---|---|---|---|---|---|
| CN | 101799111 | B | 11/2011 | | |
| CN | 107092179 | A | 8/2017 | | |
| CN | 107367920 | A | 11/2017 | | |
| EP | 3 208 667 | A1 | 8/2017 | | |
| JP | 2-140058 | U | 11/1990 | | |
| JP | H02140058 | U * | 11/1990 | | |
| JP | 2000-291779 | A | 10/2000 | | |
| JP | 2003-63424 | A | 3/2003 | | |
| JP | 2005-253292 | A | 9/2005 | | |
| JP | 2016-114508 | A | 6/2016 | | |
| JP | 2016-200228 | A | 12/2016 | | |
| JP | 2017-223661 | A | 12/2017 | | |
| KE | 2017-146300 | A | 8/2017 | | |
| WO | 98/15504 | A1 | 4/1998 | | |
| WO | WO-2011093091 | A1 * | 8/2011 | ........... | H01F 17/045 |
| WO | WO-2016020747 | A2 * | 2/2016 | ............. | G04C 17/00 |
| WO | WO-2016203063 | A1 * | 12/2016 | ............. | B22F 10/10 |

OTHER PUBLICATIONS

Notice of Reasons for Refusal dated Nov. 15, 2021 from the Japanese Patent Office in JP Application No. 2020-202436.
European Search Report dated Jun. 18, 2020 in Application No. 19217598.2.
Office Action dated Nov. 9, 2021 from the State Intellectual Property Office of P.R. of China in Application No. 202011504555.1.

* cited by examiner

METHOD FOR MANUFACTURING A MECHANICAL TIMEPIECE PART PROVIDED WITH A MAGNETIC FUNCTIONAL AREA

CROSS REFERENCE TO RELATED APPLICATIONS

This application is claiming priority based on European Patent Application No. 19217582.6 filed on Dec. 18, 2019, the disclosure of which is incorporated herein in its entirely by reference.

TECHNICAL FIELD OF THE INVENTION

The invention relates to a method for manufacturing a mechanical timepiece part provided with a magnetic functional area.

The invention also relates to a mechanical timepiece part obtained by such a manufacturing method. The mechanical timepiece part is for example a micromechanical part, typically a wheel, a plate, an anchor lever, a balance or else an axis.

PRIOR ART

In the field of mechanical components in frictional contact and in relative displacement, such as the field of watchmaking, the proper operation of mechanical parts depends, among others, on their lubrication. The main function of a lubricant thus used is to separate the surfaces in contact which are in relative displacement while reducing energy dissipation and wear.

The lubricants used fall mainly into two categories: fluid lubricants and lubricants using a lubrication called solid lubrication of mechanisms. Solid lubricants, which generally have a lamellar structure, are used less in watchmaking than fluid lubricants because they inherently generate debris. Such solid lubricants thus have the disadvantage of causing mechanical wear in the longer or shorter term. However, such wear, which is difficult to predict, prove to be very detrimental to the reliability of a timepiece movement.

Fluid lubricants are generally in the form of more or less viscous greases or oils. They have the advantage of being easier and faster to apply than solid lubricants. The volume of lubricant to be used is also more easily controlled. The physical features of oils (viscosity, wettability, etc.) allow the lubrication of several functional areas of a mechanism, regardless of the complexity of the latter. The energy generated by friction resulting in heating is mainly dissipated by the oil. During operation, generally an oil film is formed again, even after rupture and with a low volume used. The fluid should as much as possible remain confined in the functional areas as it naturally tends to spread out. The durability of the lubricant thus depends on its retention in the operating area: however, any watchmaker has observed that a drop of lubricant spreads out quickly on a clean part. While this ability proves to be beneficial since all the sensitive areas of a mechanism are effectively covered, it can also prove to be detrimental to the proper operation of the assembly. Indeed, a loss of oil in critical regions, typically areas of contact and relative displacement of the parts (functional areas), accentuated by a potential degradation of the latter under severe operating conditions, can cause irreversible damage. Furthermore, the lubricant can get in unwanted places and cause adhesion problems or, more generally, aesthetic problems.

The spreading of fluid lubricants, whether in the form of oils or greases, therefore poses a major problem for the operation of timepiece mechanisms. In the case of greases, a demixing is very often seen between the soap and the base oil. The latter will therefore be able to migrate onto the surfaces of the part and leave the functional areas, which leads to the problem mentioned above for fluid lubricants in the form of oils. In general, a fluid lubricant holds in place when its surface tension is higher than that of the support on which it is deposited. If the surface tension of the lubricant is too low, the oil will spread out and will not stay in its place.

In order to overcome this problem, watchmakers deposit a coating called epilame on their components. This epilame, which often comes in the form of an invisible oleophobic molecular layer, is a product that decreases the apparent surface tension of the support. It should be noted that the surface tension given by an epilame is of the order of 20 to 30 mN/m while the surface tension of a timepiece oil is typically 35 mN/m. This difference of 5 to 15 mN/m gives a drop shape with a connection angle acceptable to watchmakers. It is generally of the order of 25 to 60. This allows to keep the lubricant in the desired area. A greater angle can lead to an unwanted displacement (ball of lubricant rolling on the surface like water on new Gore-Tex™ for example).

This epilame can be deposited in several ways but the mainly known method, for this purpose, consists of dipping the mechanical part to be epilame-coated in a solution composed of a solvent and a certain amount of molecules dissolved therein which will be deposited on the surface of the part so as to modify its surface tension. The solvent is then evaporated during a next step, leaving only the deposited layer of molecules. The epilame then covers the entire surface of the part. In the first moments of operation and in the areas of friction, the epilame is removed by abrasion, leaving a surface that the lubricant can wet. Some critical mechanisms such as the escapement can be left to operate for a minimum period of time for this epilame abrasion to occur. Once this operation is completed, a new lubrication is carried out. The lubricant then wets the surfaces where the abrasion has occurred exactly at the point of friction.

However, one of the major disadvantages of such a dip coating method is related to the fact that it requires dipping a large amount of parts in baths wherein the concentrations of "active" molecules decrease, which requires a regular process monitoring and which entails a possible technical risk of having a too low concentration and therefore a too low epilame effect. In addition, the epilame-coating solvents based on fluorinated compounds implemented by this method often contravene the existing standards, which are in particular intended to fight against the greenhouse gas emission. And finally, this method provides in particular for a too high concentration of "active" molecules or a more ecological but less volatile solvent which can cause stains during the epilame-coating operation. However, they can be located far from the functional areas and therefore do not require epilame-coating.

It is understood that there is a need to find a solution, in particular which does not have the disadvantages of the prior art.

SUMMARY OF THE INVENTION

The purpose of the invention is therefore to provide a method for manufacturing a mechanical timepiece part of a timepiece allowing to define portions of the part delimiting precise functional areas for confining a lubricant, in a simple and robust manner.

To this end, the invention relates to a method for manufacturing a mechanical timepiece part comprising at least one functional area wherein a lubricant is able to be confined, the method comprising a step of constructing a blank of said part including said at least one functional area and a step of transforming said at least one functional area into a magnetised functional area capable of cooperating with said lubricant having magnetic properties in achieving said confinement of the lubricant in said at least one area.

Thanks to such features, the magnetised functional area thus allows the magnetic lubricant to be confined on the functional contact surface of this area by exerting an attractive force on this lubricant to attract it and keep it on this surface.

In other embodiments:
the transformation step comprises a sub-step of making at least one channel in a portion of the blank body located in said at least one functional area, in particular below a functional contact surface comprised in said at least one area;
the transformation step comprises a sub-step of arranging in said at least one channel a material developing a magnetic field;
the arrangement sub-step comprises a phase of inserting a fluid, in particular a crosslinkable resin, comprising magnetic particles in said at least one channel;
the arrangement sub-step comprises a phase of magnetising the magnetic particles comprised in said fluid;
the arrangement sub-step comprises a phase of defining an orientation of the polarity of the magnetic particles comprised in said fluid relative to a polarity of said lubricant;
the arrangement sub-step comprises a phase of curing said fluid comprising the magnetic particles magnetised and provided with an oriented polarity;
the magnetisation, definition and curing phases are carried out substantially simultaneously or simultaneously;
the curing phase consists of polymerisation by photo-crosslinking and/or by chemical crosslinking;
the arrangement sub-step comprises a phase of inserting at least one permanent magnet in said at least one channel;
the arrangement sub-step comprises a phase of mechanically holding said at least one permanent magnet in said at least one channel, and
the transformation step comprises a sub-step of applying a fluid comprising magnetic particles on a rear surface of said at least one functional area arranged substantially opposite a functional contact surface of this area.

The invention also relates to a mechanical timepiece part able to be obtained by such a method.

Advantageously, the part comprises at least one functional area wherein a lubricant is able to be confined, said functional area being magnetised and capable of cooperating with said lubricant when it has magnetic properties.

In particular, the part is made of a non-magnetic material and/or having a low or even zero magnetic permeability index.

BRIEF DESCRIPTION OF THE FIGURES

The purposes, advantages and features of the method for manufacturing a mechanical timepiece part according to the invention will become more apparent in the following description on the basis of at least one non-limiting embodiment illustrated by the drawings wherein.

DETAILED DESCRIPTION OF THE INVENTION

Figure 1:
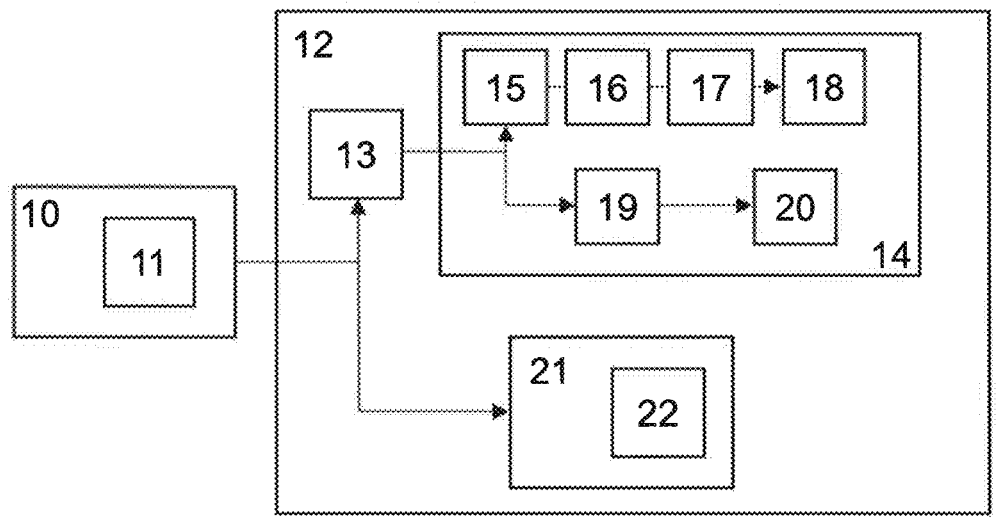
FIG. 1 is a flowchart showing the steps of a method for manufacturing a mechanical timepiece part, provided with at least one magnetic functional area according to one embodiment of the invention.

FIG. 1 shows a method for manufacturing a mechanical timepiece part 1, in particular a micromechanical part according to one embodiment of the invention. Such a mechanical part 1 is in particular defined to cooperate with another mechanical part at functional areas 2, thanks in particular to the use of a lubricant 9 having the role of separating the surfaces in contact 3 in relative displacement while reducing energy dissipation and wear. These surfaces 3 otherwise called functional contact surfaces 3 are comprised in the areas called functional areas 2 defined in these parts 1. A functional area 2 is therefore a portion of the body of a mechanical part 1 which is distinguished from the other body portions of the part 1 in that this area 2 is specifically provided to participate in the performance of the expected function of this mechanical timepiece part 1 by cooperating for example with at least one functional area 2 of another mechanical timepiece part 1 when these parts 1 are links of a kinematic chain. Such a part 1 can be a part 1 of an object using mechanical or micromechanical components in relative displacement and whose contacts are lubricated with a fluid lubricant 9 which can migrate and thus alter the tribological function. This part 1 can also be for example a mechanical part 1 of a timepiece movement otherwise called a "mechanical timepiece part". Such a mechanical timepiece part 1 can be a toothed wheel such as that illustrated in FIG. 2 or else an escapement wheel, an anchor or else any other pivoted parts such as shafts. In this context, when the part 1 is a wheel, then it comprises a functional contact surface 3 and a rear surface 4 preferably opposite the contact surface 3, said surfaces 3, 4 being separated from one another by the thickness referenced e of this wheel defined in this functional area 2.

Such a method comprises a step 10 of constructing a blank of said part including at least one functional area 2. This step 10 of the method comprises a sub-step 11 of building a body of said blank. Such a sub-step 11 can for example provide for the implementation of a process for etching layers/substrates based, for example, on a material such as silicon in a manner similar to the process carried out in document WO9815504A1. This sub-step 11 can also alternatively provide for the production of this blank body according to a process for manufacturing the body of this blank from reinforced silicon according to the technology implemented in document CH701499A2. In another alternative, this sub-step 11 can also provide for the implementation of a three-dimensional printing technology for the production of this blank body, for example that described in document WO2019106407A1. This blank body is preferably made from a non-magnetic material and/or have a low or even zero magnetic permeability index. This material can be in a non-limiting and non-exhaustive manner:

Glass: fused silica, fused quartz, aluminosilicate, borosilicate, etc.

Materials in crystalline or polycrystalline form: Silicon, Germanium, Silicon carbide, Silicon nitride, quartz, etc.

Crystalline materials: ruby, sapphire, diamond, etc.

Ceramic and glass-ceramic materials.

Polymeric materials including organic glass such as polycarbonates or acrylics.

Metallic materials in crystalline or amorphous form.

Such a blank body has the shape and all the features of the mechanical part 1 provided with at least one functional area 2 except for the arrangements/modifications provided for this blank for transforming said at least one functional area 2 into a magnetised functional area 2. Thus in this context, the method therefore comprises a step 12 of transforming said at least one functional area 2 into a magnetised functional area 2 capable of cooperating with said lubricant 9 when it has magnetic properties. Such a magnetised functional area 2 is specifically defined to participate in ensuring the confinement of the lubricant 9 in this said at least one area.

For this purpose, this step 12 comprises a sub-step 13 of making at least one channel 5 in a portion of the blank body located in said at least one functional area 2 behind the functional contact surface comprised in said at least one area. Such said at least one channel 5 which is made in the thickness e of a portion of the blank body where the functional area 2 is located, preferably has a small dimension. By way of example, the section of such a channel 5 has a surface area less than 25,000 $\mu m^2$, preferably less than 10,000 $\mu m^2$.

Such a sub-step 13 can provide for the formation of such a channel 5 from a femtosecond pulse laser, according to a technology described in document WO2019106407A1. This channel 5 is defined in the thickness of the blank body below the contact surface 3 of the functional area 2. This channel 5 has a shape and a disposition in the functional area 2 aiming at ensuring a confinement of the lubricant 9 on the contact surface 3 of the functional area 2, depending on the type of mechanical part 1 and/or the desired function for this part which is ensured in particular by the functional area 2. The disposition of the channel 5 in the functional area 2 is defined relatively to the contact surface 3 more specifically depending on the distance/thickness e present between this contact surface 3 and the channel 5. In addition, this disposition can also be defined relatively to the length and/or width and/or extent of this contact surface 3 of the functional area 2.

Figure 2:
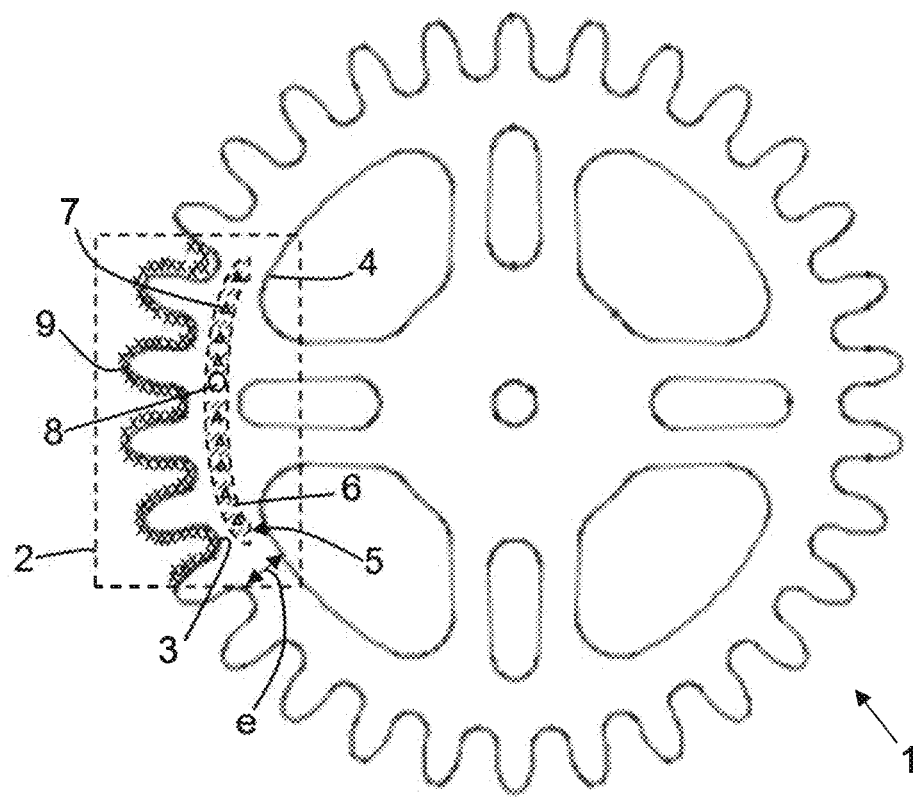
FIG. 2 is a schematic view of a variant of the mechanical part comprising this said at least one magnetic functional area confining a magnetic lubricant according to the embodiment of the invention.

Such a channel 5 comprises an opening 8 which is defined in the lateral face of the blank body comprised in the functional area 2 or in the rear surface 4 of this functional area 2, this opening 8 connects an enclosure of this channel 5 to the external environment of the blank body. In the present embodiment, where the mechanical part 1 illustrated in FIG. 2 is a wheel, this opening 8 is defined in the lateral face of the functional area 2 of the wheel. It will be noted that a plurality of channels 5 can be defined in the functional area 2, thus forming a network of channels not shown in FIG. 2. In such a configuration, the shape and the distribution of these channels in the functional area, are then carried out to ensure a confinement of the lubricant 9 on the contact surface of the functional area, depending on the type of the mechanical part 1 and/or the desired function for this part 1 which is ensured in particular by the functional area. The distribution of these channels of this network in the functional area, is defined relative to the contact surface more specifically depending on the distance/thickness e present between this contact surface 3 and the channel 5. In addition, this distribution can also be defined relative to the length and/or width and/or the extent of this contact surface 3 of the functional area 2.

This transformation step 12 then comprises a sub-step 14 of arranging in the enclosure of said at least one channel 5 a material developing a magnetic field. Such a material developing a magnetic field can be a fluid 6 such as a polymer comprising magnetic particles 7 such as, for example, Samarium-Cobalt or Neodymium-Iron-Boron or else ferromagnetic particles. This fluid 6 comprising these magnetic particles 7 is typically photosetting, thermosetting or else chemically setting. In other words, this fluid 6 can be a photosetting or thermosetting polymer, such as for example a crosslinkable epoxy resin. It will be noted that when the fluid 6 is chemically setting, then it comprises two components: a polymer such as the resin, for example epoxy resin, and a polymerising agent, for example 1,4,7,10-tetraazadecane, for curing. In contact with these two components, a solid material, for example polyepoxide, is formed. This chemical curing works according to a principle similar to that of two-component adhesive Araldite™.

This sub-step 14 comprises a phase 15 of inserting this fluid 6 comprising magnetic particles 7 in said at least one channel 5. During this phase 15, the fluid 6 comprising these magnetic particles 7 is introduced via the opening 8 of said at least one channel 5 in the enclosure of the latter. Subsequently, this sub-step 14 comprises a phase 16 of magnetising the magnetic particles 7 comprised in this fluid 6 and a phase 17 of defining an orientation of the polarity of the magnetic particles 7 comprised in said fluid 6 relative to a polarity of said lubricant 9. These two magnetisation 16 and definition 17 phases are carried out from a permanent magnet which is then arranged near the functional area 2 comprising said channel 5 wherein the fluid 6 is comprised. By way of example, in this configuration, the permanent magnet can be arranged opposite the contact surface 3. Thus, from this permanent magnet these magnetic particles 7 are then magnetised so that their polarity is oriented in a well-defined sense which is complementary to the sense of polarity of the magnetic lubricant 9. Complementary should be understood here that the senses of polarity of the lubricant 9 and of the magnetic particles 7 are such that they allow an attraction between the magnetic lubricant 9 and the functional area 2 to be ensured comprising the magnetic particles 7 and therefore the confinement of this lubricant 9 in the functional area 2 comprising these magnetic particles 7. Then, the sub-step 14 comprises a phase 18 of curing said fluid 6 comprising the magnetic particles 7 magnetised and provided with an oriented polarity. This curing phase 18 consists of polymerisation by photo-crosslinking, thermo-crosslinking and/or by chemical crosslinking when the fluid 6 is a crosslinkable polymer. In other words, the crosslinking is carried out thermally by passage through an oven, heating by laser or else via electromagnetic radiation provided that the material constituting the blank body wherein said at least one channel has been made is transparent to the considered wavelengths. It is also possible to consider a chemical crosslinking via the use of two components such as a two-component adhesive working according to the principle of the two-component adhesive Araldite™. It is also possible, depending on the choice of the resin used, for a natural crosslinking to be sufficient in the case, for example, where this resin comprises a solvent. Indeed, a brief moment in the open air is sufficient for the solvent to evaporate and for the resin to cross-link "by itself".

It will be noted that the magnetisation 16, definition 17 and curing 18 phases are carried out simultaneously or substantially simultaneously.

In a variant of the method, the arrangement sub-step 14 may provide, as a replacement for the fluid 6 insertion 15, magnetisation 16, definition 17 and curing 18 phases, the following phases:
- a phase 19 of inserting at least one permanent magnet in said at least one channel 5, and
- a phase of mechanically 20 holding said at least one permanent magnet in said at least one channel 5.

During the insertion phase 19, said at least one permanent magnet which is here a solid magnet, is arranged/placed/driven in the channel 5 so as to have a polarity oriented in a defined sense which is complementary to the sense of polarity of the magnetic lubricant 9. Each magnet can have a particular shape which is defined according to the type of mechanical part 1 and/or the desired function for this part in order to ensure optimal confinement of the magnetic lubricant 9 in the functional area 2. During the mechanical holding phase 20, said at least one permanent magnet is mechanically fastened to a wall of the enclosure of the channel 5 by gluing, welding, etc.

It will be noted that these two insertion 19 and mechanical holding 20 phases can be carried out simultaneously as soon as this assembly sub-step is implemented by a process of three-dimensional printing of said permanent magnet on the internal wall 4 of the enclosure of the channel 5, for example using the technology known under the trademark Femtoprint™.

In another variant of the method, the transformation step may only comprise a sub-step of applying 21 a fluid 6 comprising magnetic particles 7 on an internal surface 4 of said at least one functional area 2 arranged substantially opposite a functional contact surface 3 of this area 2. This fluid 6 is typically photosetting, thermosetting or else chemically setting. In other words, this fluid 6 can be a photosetting or thermosetting polymer, such as for example a cross-linkable epoxy resin. It will be noted that when the fluid 6 is chemically setting, then it comprises two components, a polymer such as the epoxy resin and a polymerising agent, 1,4,7,10-tetraazadecane, for curing. In contact with these two components, a polyepoxide is formed. This chemical curing works according to the principle of the two-component adhesive Araldite™. This application sub-step 21 can provide a phase 22 of projecting at least one collimated or localised beam of fluid 6 comprising magnetic particles 7 on the internal surface 4 of the functional area 2. This phase 22 can be carried out in the form of a projection of a single beam of fluid 6 on the internal surface 4. The beam is for example configured to project on the internal surface 4 a continuous/discontinuous and localised bead of this fluid 6. As a variant, phase 22 can be carried out in the form of a projection on the internal surface 4 of two collimated or localised beams. The first beam comprises the fluid 6 containing the magnetic particles 7 and the second beam comprises a liquid material selected so as to cause solidification of the fluid 6 when it is contacted with the latter. As already mentioned previously, this is the principle of the two-component adhesive Araldite™, consisting of an epoxy resin comprising the magnetic particles 7 and a material such as a polymerising agent, 1,4,7,10-tetraazadecane. In contact with these two components, a polyepoxide is formed.

In this method, the magnetic lubricant 9 can be based on ionic liquids as described in patent documents CN104879384A and/or JP2008081673A. For example, this ionic liquid can be composed of a 1-butyl-3-methylimidazolium chloride ([bmim] Cl) cation and an $FeCl_3$ anion.

This magnetic lubricant 9 can comprise one or more conventional lubricants wherein magnetic particles 7 are added, such as for example ferrofluids. These ferrofluids are colloidal suspensions of ferromagnetic or ferrimagnetic nanoparticles of a size of the order of 10 nanometres in a liquid fluid. In this context, such a fluid becomes magnetic upon application of an external magnetic field while maintaining a colloidal stability. Ferrofluids are most commonly composed of nanoparticles of magnetite ($Fe_3O_4$) or maghemite ($\gamma$-$Fe_2O_3$), both of which are iron oxides. The fluid can be an ionic liquid or an ester or mineral oil.

It will be noted that such a magnetic lubricant 9 can be additivated. Anti-wear, anti-corrosion, high pressure, anti-oxidant or surfactant additives can be mentioned among a long list of possibilities.

Thus, the invention allows to have a mechanical timepiece part 1 whose functional area 2 is magnetised in order to confine the magnetic lubricant 9 on the functional contact surface 3 of this area. Indeed, according to the variants described, the material developing a magnetic field present in the functional area 2 of this part exerts an attractive force on this lubricant 9 to attract it to the contact surface 3 depending on the disposition/distribution of this material under this surface 3 and on the shape of said at least one channel 5, where appropriate.

The invention claimed is:

1. A method for manufacturing a mechanical timepiece part comprising at least one functional area wherein a lubricant is able to be confined, the method comprising:
    a step of constructing a blank of said part including said at least one functional area; and
    a step of transforming said at least one functional area into a magnetized functional area capable of cooperating with said lubricant having magnetic properties in achieving said confinement of the lubricant in said at least one functional area,
    wherein the transformation step comprises the following sub-steps:
        forming at least one channel in a portion of the blank body located in said at least one functional area behind a functional contact surface comprised in said at least one area
        inserting a fluid comprising magnetic particles in said at least one channel;
        magnetizing the magnetic particles comprised in said fluid;
        defining an orientation of the polarity of the magnetic particles comprised in said fluid relative to a polarity of said lubricant; and
        curing said fluid comprising the magnetic particles magnetized and provided with an oriented polarity, and
    wherein the magnetizing, defining and curing sub-steps are carried out substantially simultaneously.

2. The method according to claim 1, wherein the curing phase consists of polymerisation by photo-crosslinking and/or by chemical crosslinking.

3. The method according to claim 1, wherein the transformation step comprises a sub-step of applying a fluid comprising magnetic particles on a rear surface of said at least one functional area arranged substantially opposite a functional contact surface of this area.

4. A mechanical timepiece part obtained by a method in accordance with claim 1.

5. The part according to claim 4, wherein it is made of a non-magnetic material and/or having a low or even zero magnetic permeability index.

\* \* \* \* \*